United States Patent
Mimura

(10) Patent No.: US 6,838,804 B2
(45) Date of Patent: Jan. 4, 2005

(54) INSULATION CAP STRUCTURE FOR ROTATING MACHINE

(75) Inventor: Hisashi Mimura, Nagano-ken (JP)

(73) Assignee: Tamagawa Seiki Kabushiki Kaisha, Nagano-ken (JP)

( * ) Notice: Subject to any disclaimer, the term of this patent is extended or adjusted under 35 U.S.C. 154(b) by 86 days.

(21) Appl. No.: 10/314,338

(22) Filed: Dec. 9, 2002

(65) Prior Publication Data

US 2003/0222529 A1 Dec. 4, 2003

(30) Foreign Application Priority Data

May 31, 2002 (JP) .......................................... 2002-159462

(51) Int. Cl.⁷ ................................................. H02K 3/46
(52) U.S. Cl. ..................................... 310/260; 310/254
(58) Field of Search ................................. 310/260, 254, 310/270, 89, 43, 71

(56) References Cited

U.S. PATENT DOCUMENTS

| | | |
|---|---|---|
| 4,287,446 A | 9/1981 | Lill et al. |
| 4,689,023 A | 8/1987 | Strong, III et al. |
| 5,698,923 A | 12/1997 | Scherzinger et al. |
| 5,763,978 A | 6/1998 | Uchida et al. |
| 5,969,455 A * | 10/1999 | Sakamoto .................... 310/194 |

FOREIGN PATENT DOCUMENTS

EP    0 910 152 A1    4/1999

OTHER PUBLICATIONS

Patent Abstract of Japan, 2001218409A, Aug. 10, 2001.
Patent Abstract of Japan, 57028536A, Feb 16, 1982.
Patent Abstract of Japan, 2002119005A, Apr. 19, 2002.

* cited by examiner

*Primary Examiner*—Thanh Lam
(74) *Attorney, Agent, or Firm*—Sughrue Mion, PLLC

(57) ABSTRACT

To improve winding speed and productivity of a rotating machine by providing curved edges on corner portions of tongues of an insulation cap body. In an insulation cap structure for the rotating machine, corner portions of tongues of an insulation cap body disposed in a stator core or a rotor core is formed so as to have curved edges, and a locus of a needle at the time of winding is close to a circle rather than a rectangle of prior art, whereby winding speed can be increased.

9 Claims, 2 Drawing Sheets

10: CORNER PORTION (CURVED EDGES)
30: ROTATIONAL LOCUS

1: STATOR CORE
1a: STATOR CORE PIECE
1A: FIRST END SURFACE
1B: SECOND END SURFACE

2: MAGNETIC POLE
3: FIRST INSULATION CAP
3a, 4a: TONGUE
4: SECOND INSULATION CAP
5: INSULATION CAP BODY
10: CORNER PORTION

10: CORNER PORTION (CURVED EDGES)
30: ROTATIONAL LOCUS

- 1: STATOR CORE
- 1a: STATOR CORE PIECE
- 1A: FIRST END SURFACE
- 1B: SECOND END SURFACE
- 2: MAGNETIC POLE
- 3: FIRST INSULATION CAP
- 3a, 4a: TONGUE
- 4: SECOND INSULATION CAP
- 5: INSULATION CAP BODY
- 10: CORNER PORTION

- 10: CORNER PORTION
- 30: ROTATIONAL LOCUS

INSULATION CAP STRUCTURE FOR ROTATING MACHINE

BACKGROUND OF THE INVENTION

1. Field of the Invention

The present invention relates to an insulation cap structure for a rotating machine, and more particularly to a novel improvement in facilitation of operation of a winding machine and improvement of productivity, the improvement being achieved by forming corner portions of a tongue of an insulation cap for insulating a coil to be wound around a core into arcuate or C-shaped curved edges and by making a locus of winding of the coil by the winding machine approximately circular.

2. Description of the Related Art

Up to now, the structure shown in FIG. 3 is generally employed as this type of conventional insulation cap structure for a rotating machine.

That is, in FIG. 3, reference numeral 1 denotes a stator core formed by laminating a plurality of stator core pieces 1a formed in a ring shape. On an inner surface of this stator core 1, a plurality of magnetic poles 2 projecting inwardly are formed at predetermined angle intervals.

The stator core 1 has first and second end surfaces 1A and 1B provided with a pair of first and second insulation caps 3 and 4 made of a resin, and the respective insulation caps 3 and 4 constitute an insulation cap body 5.

Tongues 3a and 4a formed on the inner surface of the respective insulation caps 3 and 4 extend along the axial direction of the stator core 1 and are formed in rectangular shapes as shown in FIG. 4.

Corner portions 10 provided on both sides of the respective tongues 3a and 4a have right-angled shapes, and the respective tongues 3a and 4a are formed in a rectangular shape as a whole with the magnetic pole 2 of the stator core 1 sandwiched, as shown in FIG. 4. Note that portions 20 shown by broken lines in FIG. 4 indicate the thickness of the respective insulation caps 3 and 4.

The conventional insulation cap structure for a rotating machine is constructed as described above, and therefore has the following problem.

That is, since the corner portions of the tongues of the respective insulation caps are formed in a right-angled shape, in the case where a coil is wound around outer peripheries of the respective magnetic poles in this state (that is, in slots between the respective magnetic poles), by means of an automatic winding machine, with the coil being insulated by the respective insulation caps, a rotational locus 30 of a needle of the automatic winding machine for winding this coil takes a rectangular shape as shown in FIG. 4. Therefore, program of a servo system for controlling the operation of the needle is complicated.

Moreover, since a locus of the needle is a square in this way, speeding-up of the operation of the needle itself is restricted, resulting in a serious obstacle to mass production.

SUMMARY OF THE INVENTION

The present invention has been made to solve the above-mentioned problem, and therefore it is an object of the present invention to provide an insulation cap structure for a rotating machine capable of facilitating operation of a winding machine and achieving improvement of productivity by forming corner portions of a tongue of an insulation cap for insulating a coil to be wound around a core into arcuate or C-shaped curved edge and by making a locus of winding of the coil by the winding machine approximately circular.

According to the present invention, there is provided an insulation cap structure for a rotating machine, in which a coil is wound around a stator core or a rotor core of the rotating machine through an insulation cap body formed in a ring shape, wherein tongues formed on an inside or outside of the insulation cap body and extended along an axial direction of the stator core or the rotor core are provided with corner portions having curved edges formed in arcuate or C-shaped shapes, wherein the rotating machine is a resolver, wherein the insulation cap body is a pair of insulation caps, and wherein the insulation cap body is formed integrally with the stator core or the rotor core using a resin.

DESCRIPTION OF THE PREFERRED EMBODIMENT

Hereinafter, description will be made for the preferred embodiment of an insulation cap structure for a rotating machine according to the present invention with reference to the accompanying drawings. Note that parts identical or equivalent to those of the prior art are described using the same symbols as those used in the prior art.

Figure 1:
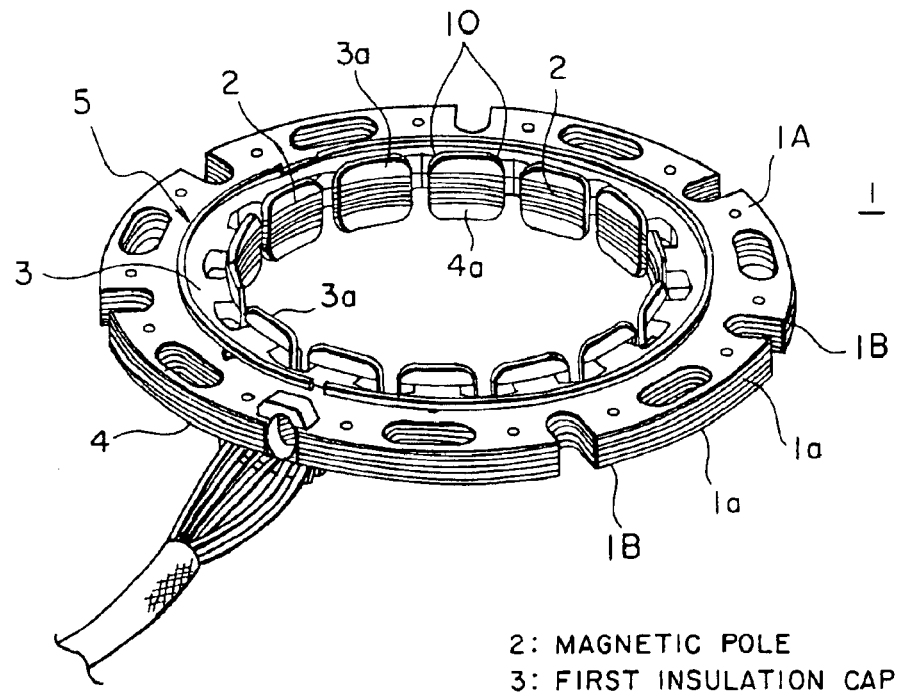
FIG. 1 is a perspective view showing an insulation cap structure for a rotating machine according to the present invention.

In FIG. 1, reference numeral 1 denotes a stator core, of a rotating machine such as a resolver, or a motor, constituted by laminating a plurality of stator core pieces 1a formed in a ring shape (here the whole construction of the rotating machine is not shown), and a plurality of magnetic poles 2 projecting inwardly are formed at predetermined angle intervals on an inner surface of this stator core 1.

A pair of first and second insulation caps 3 and 4 made of a resin are disposed on sides of first and second end surfaces 1A and 1B of the stator core 1, and the respective insulation caps 3 and 4 constitute an insulation cap body 5.

Figure 2:
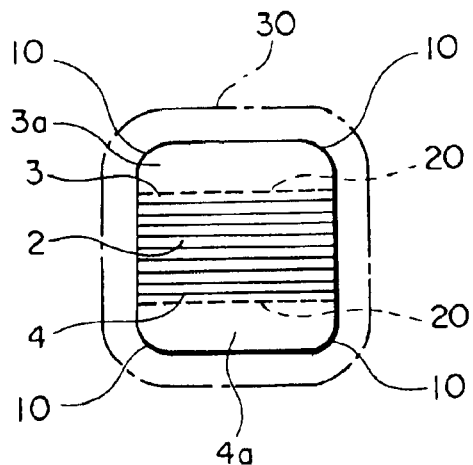
FIG. 2 is a front view seen from the inside of one of magnetic poles of FIG. 1.
Figure 3:
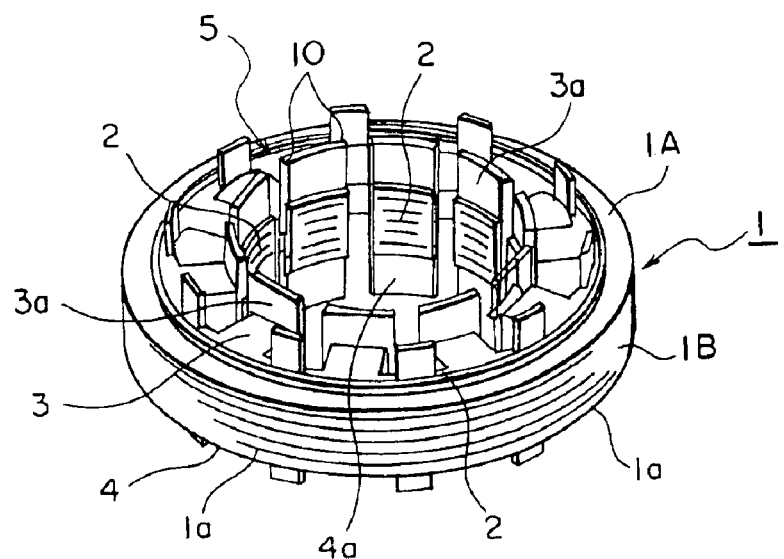
FIG. 3 is a perspective view showing a prior art structure.
Figure 4:
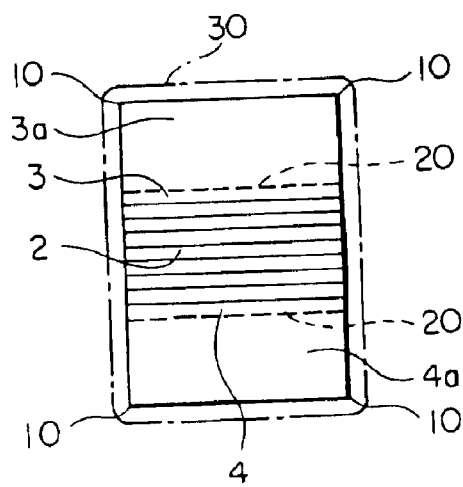
FIG. 4 is a front view seen from the inside of one of magnetic poles of FIG. 3.

The respective insulation caps 3 and 4 have tongues 3a and 4a which are formed on their inner surfaces and extend along an axial direction of the stator core 1, and the tongues 3a and 4a have respective corner portions 10 rounded in shape as shown in FIG. 2. In short, these corner portions 10 have curved edges formed in arcuate (circular) shapes or C-shapes by a curving process.

Since the respective corner portions 10 have the above-mentioned curved edges as shown in FIG. 2, an outer peripheral shape defined by the magnetic pole 2 and the respective tongues 3a and 4a can be formed in a shape close to a circle rather than a rectangle of prior art when the magnetic pole 2 is seen from its inside. Note that a portion 20 shown by broken lines in FIG. 2 indicates a thickness of the respective insulation caps 3 and 4.

In the above-mentioned construction, in the case where a coil is wound around the outer periphery of the respective insulation caps 3 and 4 on the magnetic poles 2 (that is, the coil is wound in a state where it is insulated with respect to the magnetic poles 2 through the respective insulation caps 3 and 4) by rotating a needle of an automatic winding machine (not shown), a rotational locus 30 of this needle can take an approximately circular shape differently from a conventional rectangular shape since the needle can be moved along the curved edges of the corner portion 10. Consequently, the programming of a servo system for rotating the needle is facilitated and rotation speed of the needle can be also substantially increased.

Note that, although description has been made as to the stator core of the rotating machine, the present invention is not limited thereto and can be also applied to a rotor core having a coil. In this case, the respective tongues 3a and 4a of the respective insulation caps 3 and 4 are disposed on an outer periphery side (an outside) of the rotor core (not shown) and rotatably supported by being penetrated by rotational shafts or the like.

Moreover, the stator core of FIG. 1 shows one used for a resolver (in actuality, a rotor core (not shown) is rotatably disposed on the inside of the stator core 1) but can be applied to a motor or the like other than the resolver.

Furthermore, although description has been made as to the insulation cap body 5 using the pair of insulation caps 3 and 4, the insulation cap body 5 can be also formed by simultaneously molding the respective insulation caps 3 and 4 with respect to cores of the stator core 1 or the like by injection molding such as insert-molding.

Since the insulation cap structure for the rotating machine according to the present invention is constructed as described above, the following effect can be obtained.

That is, since the corner portions of the respective tongues of the insulation cap body are formed so as to have arcuate or C-shaped curved edges, a locus of the needle at the time of winding takes an approximately circular shape, and facilitation of operation of the winding machine allows increase of winding speed to thereby achieve improvement of productivity.

What is claimed is:

1. An insulation cap structure for a rotating machine, in which a coil is wound around a stator core of the rotating machine through an insulation cap body formed in a ring shape, comprising:

tongues formed on an inside or outside of the insulation cap body and extended along an axial direction of the stator core, the tongues being provided with corner portions having curved edges formed in arcuate shapes or C-shapes.

wherein the tongues are shaped such that the curved edges circumscribe a substantially circular path.

2. An insulation cap structure for a rotating machine according to claim 1, wherein the rotating machine is a resolver.

3. An insulation cap structure for a rotating machine according to claim 1, wherein the insulation cap body is a pair of insulation caps.

4. An insulation cap structure for a rotating machine according to claim 1, wherein the insulation cap body is integrally formed with the stator core using a resin.

5. An insulation cap structure for a rotating machine according to claim 2, wherein the insulation cap body is a pair of insulation caps.

6. An insulation cap structure for a rotating machine according to claim 2, wherein the insulation cap body is integrally formed with the stator core using a resin.

7. An insulation cap structure for a rotating machine according to claim 1, wherein the tongues are shaped such that when a coil is wound around the tongues with a needle, a rotational path of the needle forms a substantially circular shape.

8. An insulation cap structure for a rotating machine according to claim 1, wherein the tongues respectively include a magnetic pole.

9. An insulation cap structure for a rotating machine according to claim 1, wherein the curved edges would each contact the circular path such that distances between contact points are equal.

* * * * *